United States Patent

[11] 3,618,775

| [72] | Inventor | William Herbert Hultgren |
| | | 6645 Emerald Lake Drive, Miramar Isles, Fla. 32541 |
| [21] | Appl. No. | 845,020 |
| [22] | Filed | July 25, 1969 |
| [45] | Patented | Nov. 9, 1971 |

[54] FILTER ASSEMBLY CHECK AND RELIEF VALVES
1 Claim, 3 Drawing Figs.

[52] U.S. Cl. .................................................. 210/130,
210/136, 210/440, 210/443
[51] Int. Cl. .................................................. B01d 34/14,
B01d 27/10
[50] Field of Search .................................................. 210/130,
136, 440, 443, 457, DIG. 17

[56] References Cited
UNITED STATES PATENTS
| 3,132,097 | 5/1964 | Tietz ............................ | 210/130 |
| 3,473,664 | 10/1969 | Hultgren ....................... | 210/130 |

*Primary Examiner*—Frank A. Spear, Jr.
*Attorney*—George R. Douglas

ABSTRACT: A spin-on oil filter comprising a cylindrical casing having a filter element therein with a closure member closing off one end having a central opening therein formed by a threaded nipple for screwing the filter onto an engine and discharging oil therefrom, oil inlet means surrounding said nipple, and oil bypass ports surrounds said nipple and disposed between said nipple and said oil inlet means, and an oil bypass valve disposed over said bypass ports and biasing means normally urging said bypass valve in a seated position, said bypass valve being disposed in parallel flow relationship with said oil inlet means and disposed within a sleeve upon which is seated an antidrainback valve, and said sleeve being disposed within the center tube of a filter element disposed within said casing.

PATENTED NOV 9 1971 3,618,775
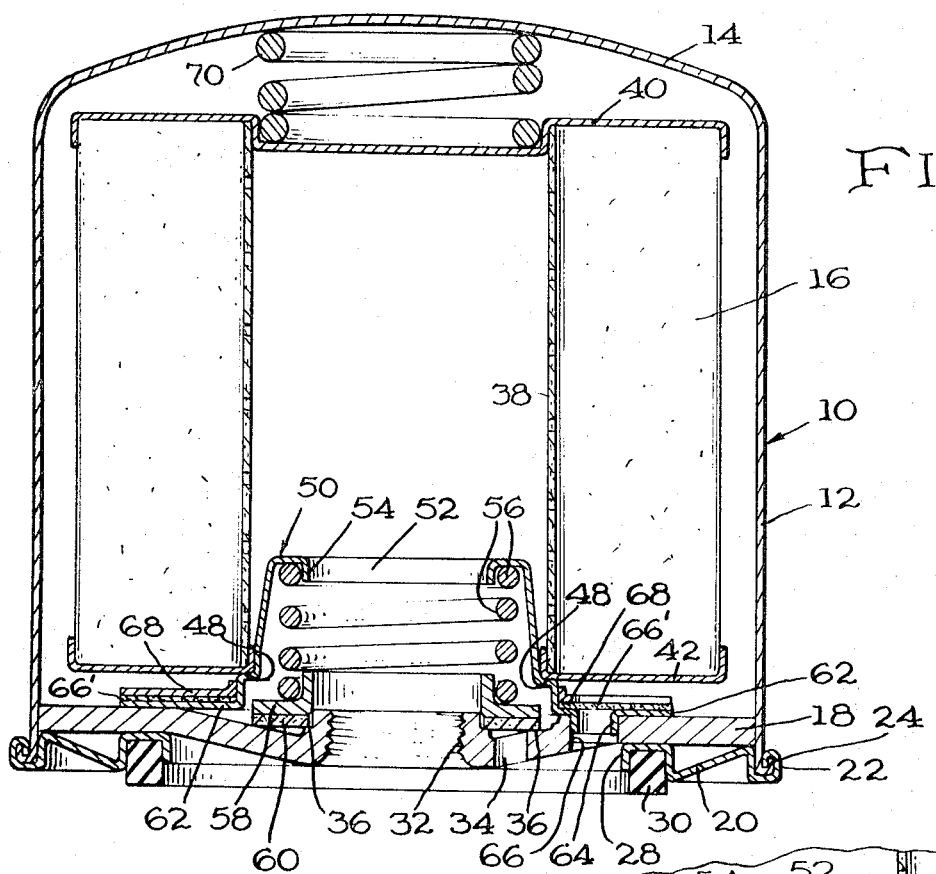
FIG. 1.
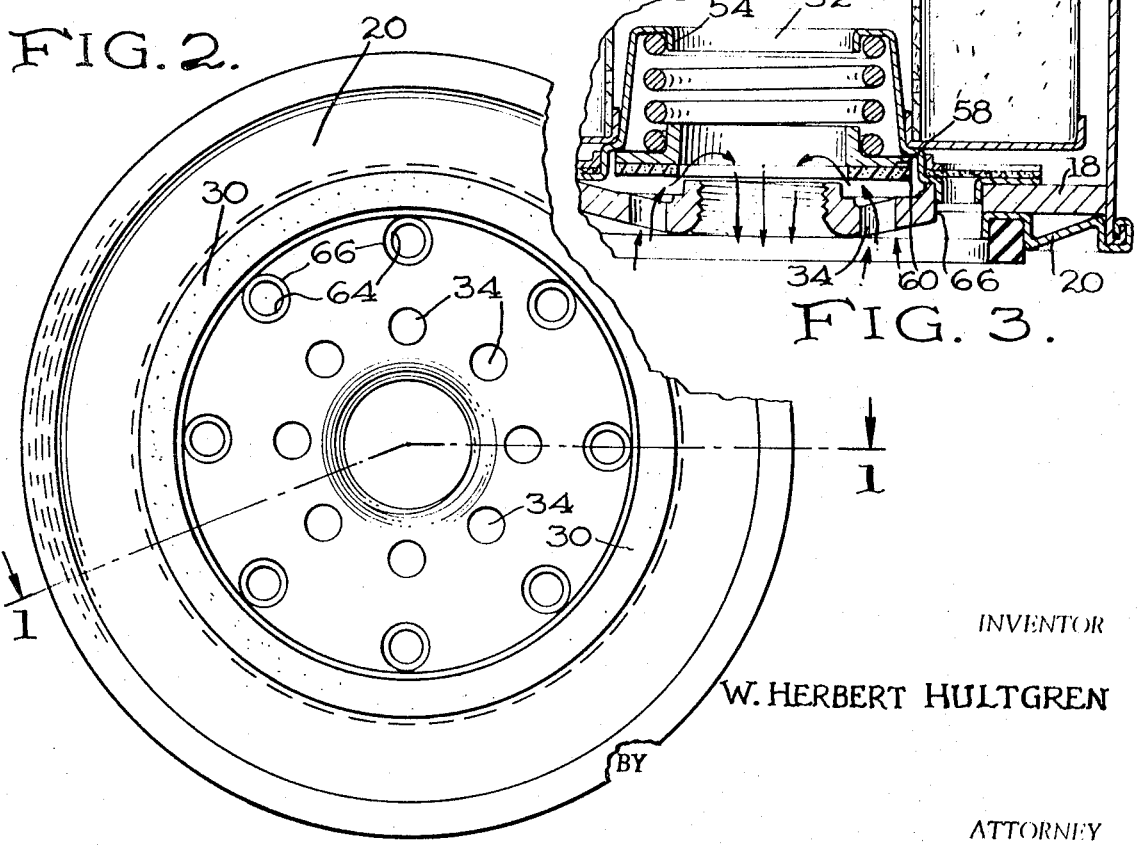
FIG. 2.
FIG. 3.
INVENTOR
W. HERBERT HULTGREN
BY
ATTORNEY

FILTER ASSEMBLY CHECK AND RELIEF VALVES

The present invention relates to a spin-on-type oil filter and more particularly to a filter in which is disposed an antidrainback valve and a bypass valve.

It is an object of the present invention to provide a spin-on-type oil filter for use with internal combustion engines and the like, which is directly threaded onto or mounted on an internal combustion engine to filter the oil which is passed from the engine through the oil filter and thereafter is passed back into the engine.

It is another object of the present invention to provide a spin-on-type oil filter having an antidrainback valve therein through which the incoming oil from an internal combustion engine passes, thereafter passes through a filter element, and thereafter is discharged through a center tube and out of a threaded nipple in a cleansed condition back into the engine, which is provided with a bypass valve disposed within a sleeve disposed within the center tube of the oil to pass directly into the closure end of the filter and directly out of the nipple, completely bypassing the filter element when the filter element is clogged.

Various other objects and advantages of the present invention will be readily apparent from the following detailed description when considered in connection with the accompanying drawing forming a part thereof and in which FIG. 1 is a sectional view taken along the lines 1—1 of FIG. 2, and FIG. 3 is a detailed view illustrating the bypass valve when it is unseated.

Referring to the drawings, the reference numeral 10 generally designates an oil filter having a cylindrical casing or housing 12 provided with an upper closed end 14 and in which is encased a filter element or cartridge 16. The bottom of the housing 12 is closed off by a closure member or circular plate 18 which is relatively thick. This reinforced plate 18 is disposed within the casing 12 by a retainer plate 20 disposed against the bottom of the closure member and provided with a turned up lip 22 that is rolled over a complementary lip 24 disposed on the bottom edge of the casing to form a liquid-tight seal. The retainer plate 20 may be tack welded at various points to the closure member 18. The inner periphery of the retainer plate 20 is provided with an annular recess 20a that is provided with a resilient gasket 30 therein so as to form a liquid-tight seal against the block of an engine when the filter is secured thereto.

The central portion of the closure member 18 is provided with an inturned threaded nipple or bushing 32. The nipple 32 has surrounding it a plurality of oil bypass ports 34 and has an annular shoulder thereground.

The cartridge 16 is preferably of a resin-impregnated pleated paper-type with a perforated center tube 38 and has its opposite ends sealed off by end caps 40 and 42.

The filter cartridge 16 is seated on an annular shoulder 48 of a sleeve 50 which extends upwardly into the center tube 38. The sleeve 50 has a central discharge opening 52 in the top thereof and a turned down rim 54 which retains a biasing spring 56 therein which has its lower end abutting an annular bypass valve disc 58 provided with a gasket 60 which seats on the shoulder 36 to close off the bypass ports 34 during normal operation of the filter element, when it is not clogged. The sleeve 50 is further provided with an extension or annular horizontally extending portion 62, which seats on the closure member 18 and is provided with circular lips 16 which extend into a plurality of circumferentially spaced oil inlet ports 66 disposed in the closure member 18.

A resilient annular gasket 66¹ and an annular resilient member 68 which may be made of spring steel and disposed over the gasket 66¹ forms the antidrainback valve of the oil filter. The annular resilient leaf spring 68 may be press-fitted over the extension 62 of the sleeve 50 so as to normally maintain the inlet oil ports 66 closed unless oil is flowing thereto.

The ports 66 are disposed circumferentially of the bypass ports 34, as best seen in FIG. 2. A spring member 70 disposed in the upper end of the casing 12 maintains the filter cartridge 16 seated on the shoulder 48.

In operation, oil normally enters the oil filters casing through the oil inlet ports 66 and raises the antidrainback valve from its seated position on the closure plate 18 so that the oil passes upwardly into the casing and in an outside-in direction through the filter cartridge and is discharged downwardly into the center tube 38 and passes out of the sleeve 50 and the threaded nipple 32 back into the engine.

When the filter becomes clogged, due to contaminants being removed from the oil and the back pressure builds up across the filter cartridge, the incoming oil will then directly bypass the casing 12 and flow through the bypass parts 34 disposed inwardly of the oil inlet ports 66 and raise or unseat the bypass valve disc 58 and will flow directly out of the nipple 32 back into the engine, as best illustrated in FIG. 3.

Thus the present invention provides a spin-on oil filter in which the antidrainback valve and the bypass valve are disposed side by side in the closure member of the oil filter so that, if the filter should become clogged for any reason, the oil will completely bypass the casing and short circuit the entire oil filter, taking the route of least resistance therethrough, and the shortest possible route, in that the oil bypass ports are circumferentially disposed directly adjacent the outlet nipple and inwardly of the plurality of circumferentially spaced oil inlet ports in the filter member.

By the structure in the present oil filter, namely the addition of the inner row of bypass openings or ports in the closure member or the base plate, it is possible to mount the bypass valve and the antidrainback valve or the check valve separately so that each may be calibrated individually and function so that the operation of one will not disturb the operation of the other.

The present invention also provides the novel structure in that the seat for the antidrainback valve is an extension of the bypass valve sleeve or body which also seals off the inlet from the outlet chamber, directing the oil flow through the filter element when the bypass valve is in a closed position, and the check valve or the antidrainback valve is open. The lip is further extruded in the antidrainback or check valve inlet openings or seating holes which is pressed into these holes in the base plate or the closure member, forming an effective oil seat.

Inasmuch as changes may be made in the form, location and relative arrangement of several parts without departing from the essential characteristics of the invention, it is to be understood that this invention is not to be limited except by the scope of the appended claims:

What is claimed is:

1. A spin-on oil filter comprising a casing with a closure member closing off one end thereof and having a central opening therein formed by a threaded nipple for screwing it onto an engine and discharging oil therethrough, oil inlet means in said closure member surrounding said nipple, a sleeve disposed in said casing and surrounding said nipple, a filter element disposed in said casing between said oil inlet means and nipple and seated on said sleeve, oil bypass ports in said closure member around said nipple and disposed between said oil inlet means and nipple so as to be in parallel flow relationship therewith, an annular bypass valve disc disposed around said nipple and in said sleeve over said bypass ports, biasing means normally urging said valve in a seated position, an extension on said sleeve and an antidrainback valve seated therein and over said oil inlet means, and lip means on said extension extending into said oil inlet means.

* * * * *